April 9, 1957    R. W. PARCELL    2,788,148
LOAD CARRYING INDUSTRIAL TRUCK
Filed Aug. 7, 1953    8 Sheets-Sheet 2

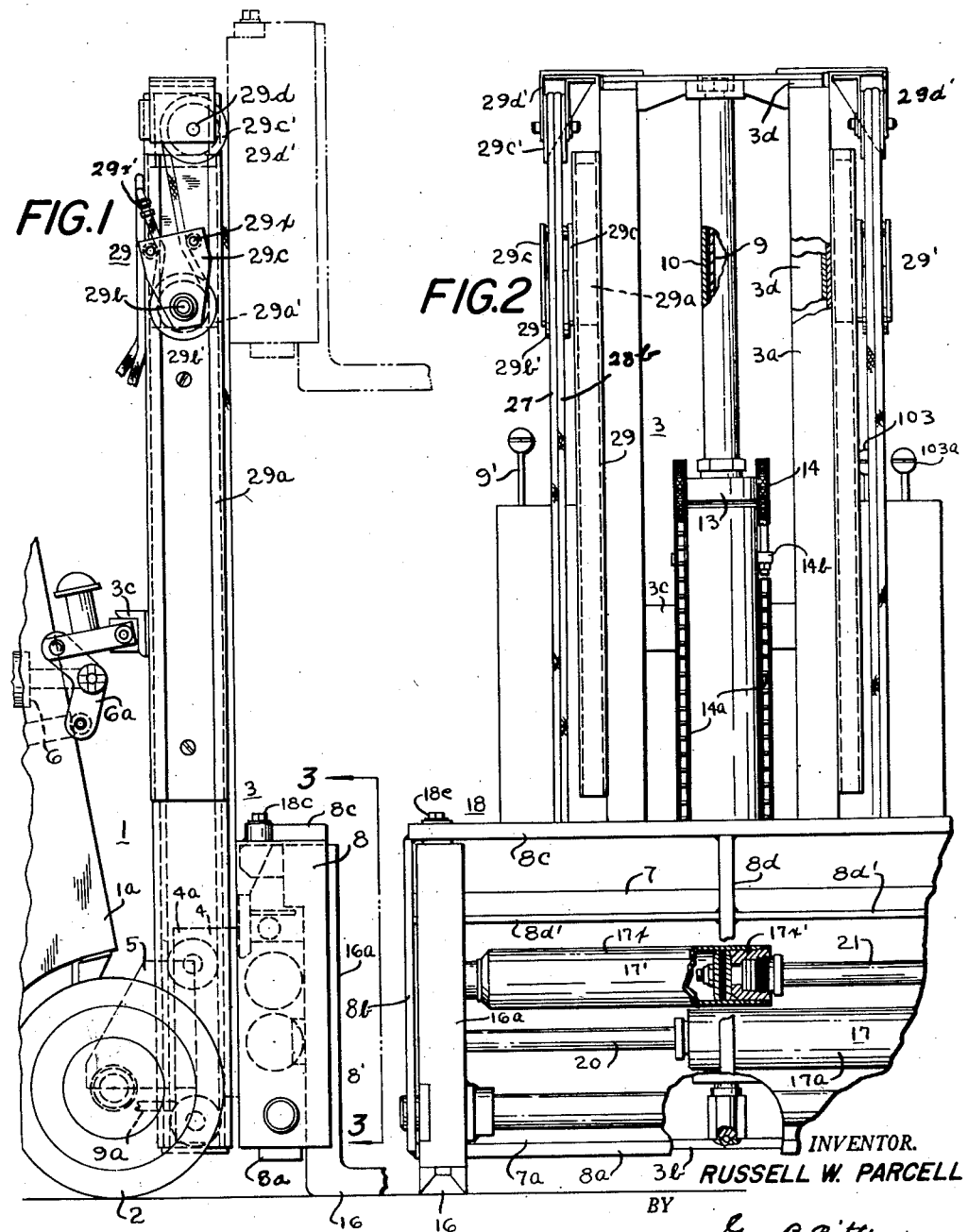

INVENTOR.
RUSSELL W. PARCELL
BY
Geo. B. Pitts
ATTORNEY

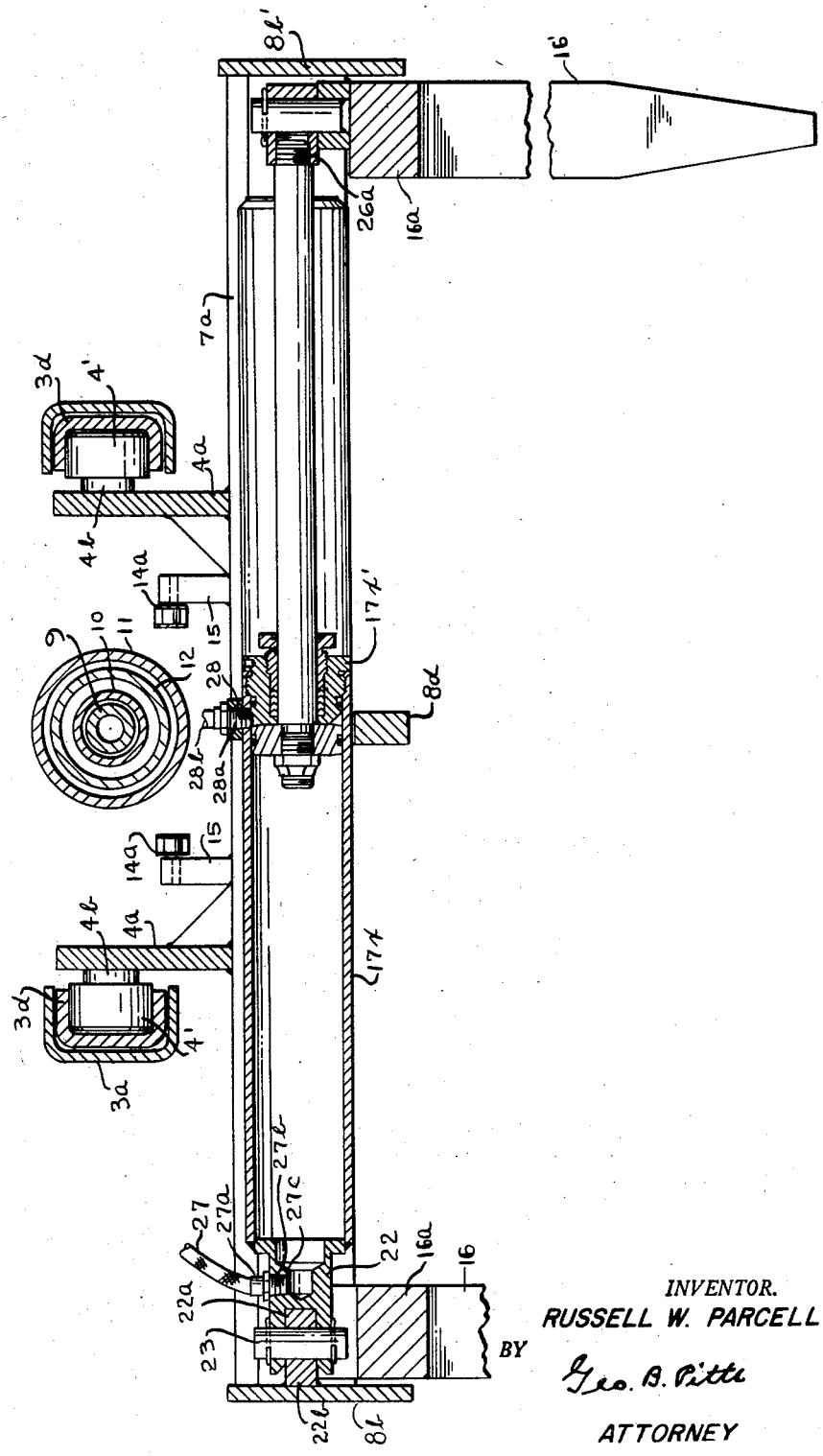

April 9, 1957
R. W. PARCELL
2,788,148
LOAD CARRYING INDUSTRIAL TRUCK
Filed Aug. 7, 1953
8 Sheets-Sheet 4
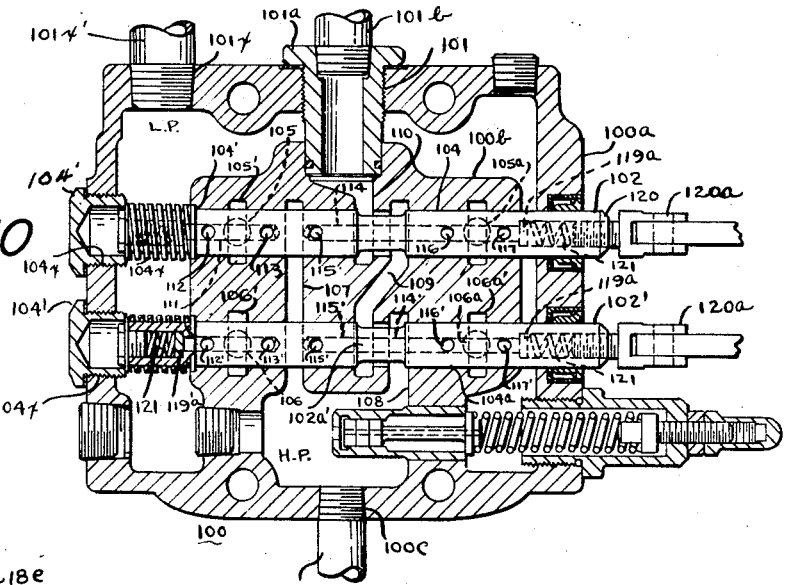
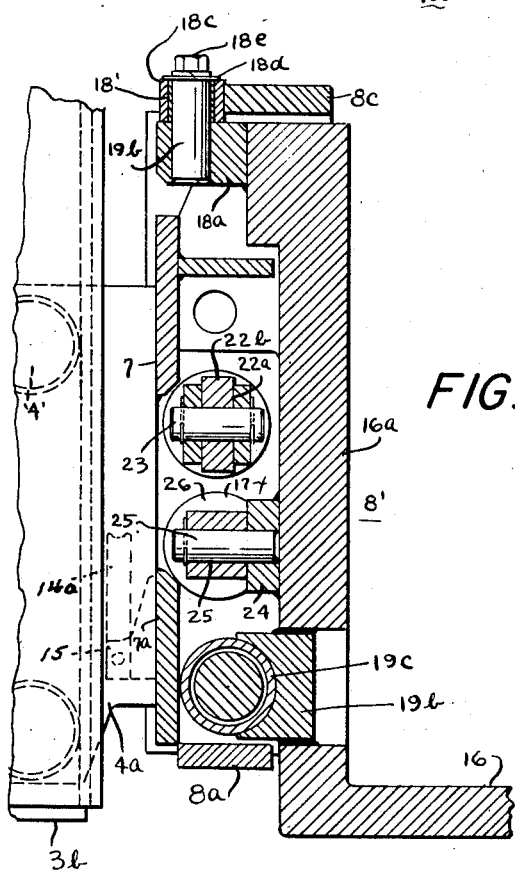
INVENTOR.
RUSSELL W. PARCELL
BY
ATTORNEY INVENTOR.
RUSSELL W. PARCELL
BY Geo. B. Pitts
ATTORNEY

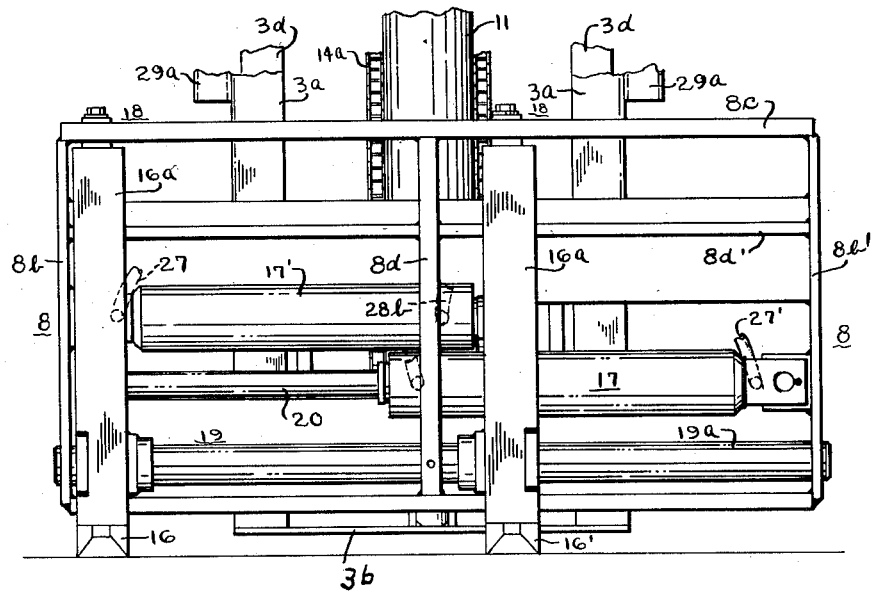
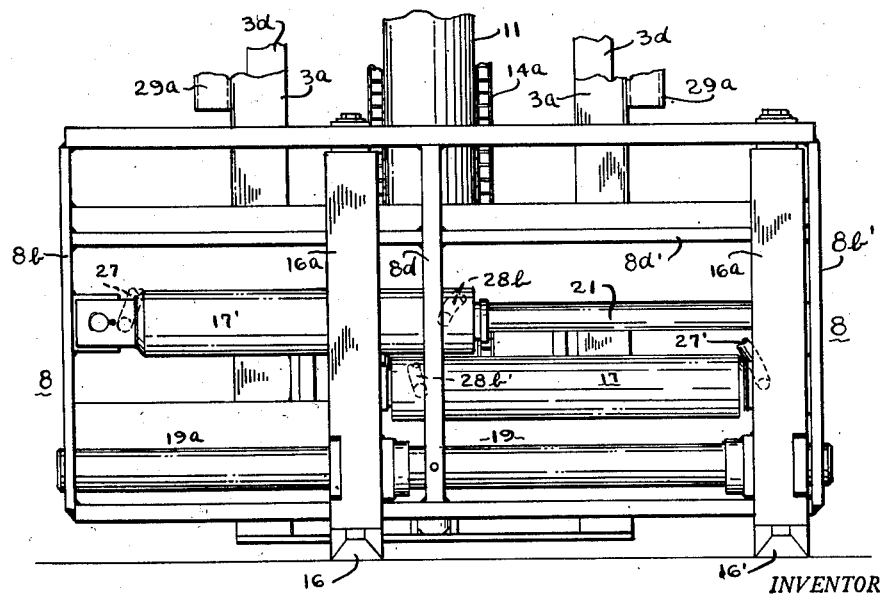

April 9, 1957 R. W. PARCELL 2,788,148
LOAD CARRYING INDUSTRIAL TRUCK
Filed Aug. 7, 1953 8 Sheets-Sheet 7

INVENTOR.
RUSSELL W. PARCELL
BY
Geo. B. Pitts
ATTORNEY

April 9, 1957 R. W. PARCELL 2,788,148
LOAD CARRYING INDUSTRIAL TRUCK
Filed Aug. 7, 1953 8 Sheets-Sheet 8
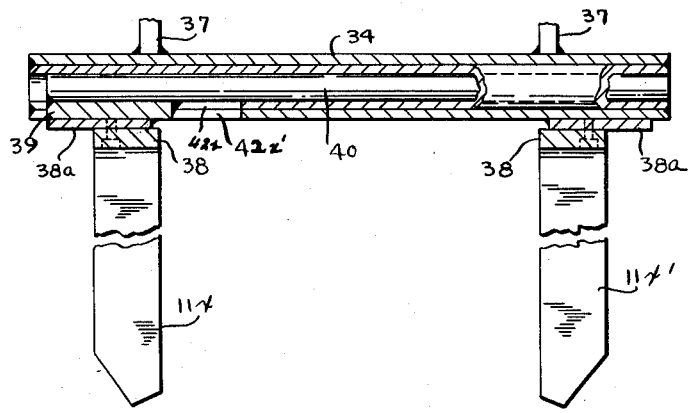
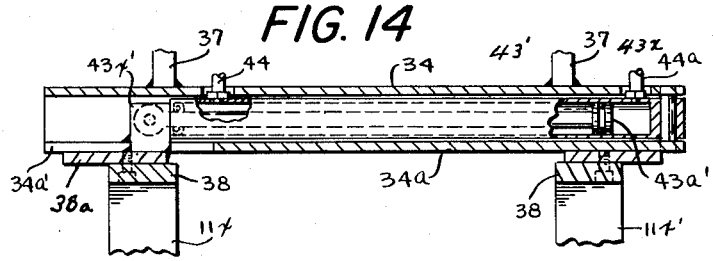
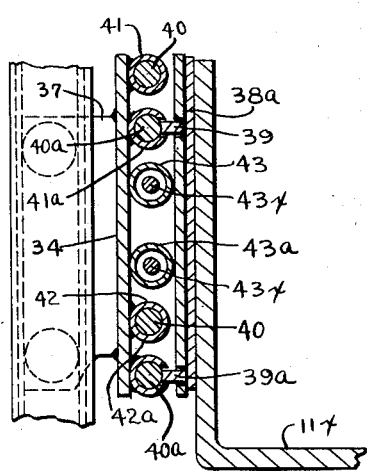
INVENTOR.
RUSSELL W. PARCELL
BY
Geo. B. Pitts
ATTORNEY

United States Patent Office 2,788,148
Patented Apr. 9, 1957

2,788,148

LOAD CARRYING INDUSTRIAL TRUCK

Russell W. Parcell, Mantua, Ohio, assignor, by mesne assignments, to The Baker-Raulang Company, a corporation of Delaware Application August 7, 1953, Serial No. 372,866

2 Claims. (Cl. 214—653)

This invention relates to an industrial truck having an elevating member for raising and lowering loads; more particularly the invention resides in providing an improved carrier, which is mounted on the elevating member, for picking up, transporting and discharging loads, and stacking and destacking loads in warehouses, freight cars, road trucks and cargo planes.

The invention consists in a form of carrier construction wherein loads may be picked up and discharged and stacked and destacked in a position directly in front of the truck or offset laterally thereof. The invention also consists in a form of construction having movable load engaging members capable of being adjusted into varying spaced relation for picking up, transporting and discharging loads of varying sizes. As hereinafter set forth, the load engaging members may be (a) operated, either one relatively to the other, into a spacedly related position for supporting thereon loads of varying sizes or (b) simultaneously toward each other to clamp the load between them, whereby bags filled with materials, bales of cotton, hay and like materials may be raised and transported.

The invention also consists of a form of construction wherein either or both load engaging members may be moved to positions laterally and beyond the side walls of the frame on which they are slidably mounted, whereby (a) large loads may be engaged, raised and transported or (b) the loads, which are offset with respect to the truck may be readily picked up, thereby eliminating shifting of the truck to effect pick-up and discharge operations.

One object of the invention is to provide, in an elevating type of industrial truck, an improved carrier having a pair of slidably mounted load engaging members and separate valve controlled fluid operated units therefor, for moving the load engaging members independently or conjointly, whereby a wide range of load handling operations may be carried out.

Another object of the invention is to provide, in an elevating type of industrial truck, an improved load carrier having a frame provided with a pair of slidably mounted load engaging members, wherein provision is made for sliding either or both of said members laterally beyond the sides of the frame for engaging large loads or loads positioned in offset relation to the frame.

A further object of the invention is to provide, in an industrial truck of the elevating type, an improved load carrier of simplified construction wherein a pair of load engaging members are slidably mounted on a frame and separately operated by fluid operated cylinder-piston elements.

Other objects of the invention will be apparent to those skilled in the art to which my invention relates from the following description taken in connection with the accompanying drawings, wherein Fig. 1 is a fragmentary side elevational view of the front end portion of an elevating type of industrial truck embodying the present invention, parts being broken away;

Fig. 2 is a fragmentary front elevational view of the truck shown in Fig. 1;

Fig. 4 is a fragmentary view taken approximately on the line 4—4 of Fig. 3;

Fig. 5 is a fragmentary view taken approximately on the line 5—5 of Fig. 3;

Figs. 6, 7, 8 and 9 are fragmentary front elevational views similar to Fig. 3 but on a smaller scale and showing various positions of the load engaging members;

Fig. 10 is a sectional view of the valve for controlling the supply of fluid under pressure to either end of each cylinder and discharge therefrom;

Figure 11:
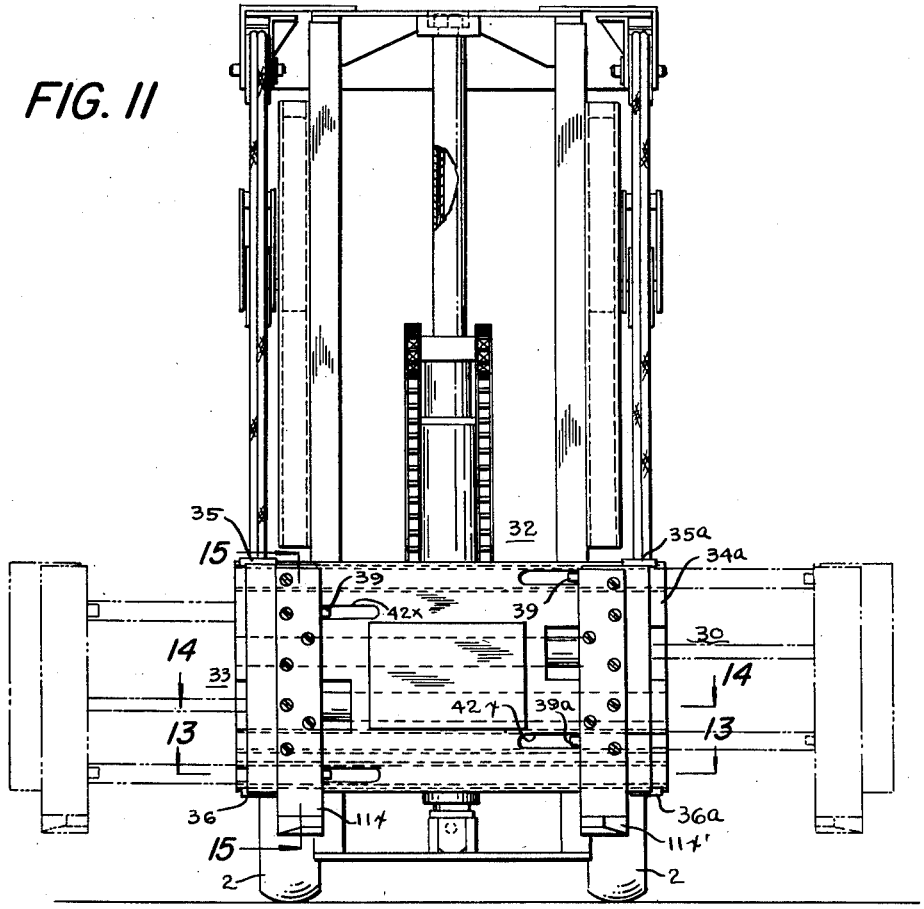
Fig. 11 is a front elevational view of an industrial elevating truck having a carrier embodying a modified form of construction.
Figure 12:
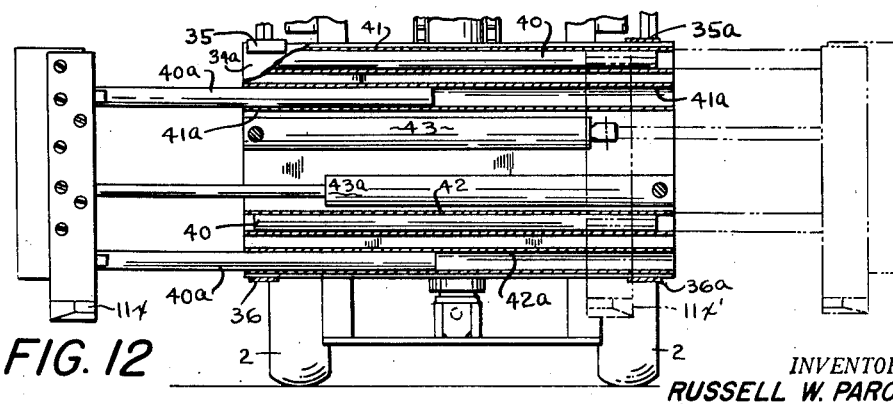

Fig. 12 is a fragmentary front elevation of the truck illustrated in Fig. 11, but with portions broken away and one of the load engaging members in extended position; and Figs. 13, 14 and 15 are views taken approximately on the lines 13—13, 14—14 and 15—15, respectively, of Fig. 11.

In the drawings, 1 indicates a truck having a frame 1a mounted on pairs of front and rear wheels, only the front portion of the frame 1a and front wheels 2 being shown. The wheels of one pair thereof being driven by a suitable motive power (not shown), whereas the wheels of the other pair are mounted to provide for steering of the truck. 3 indicates as an entirety upright guide means for an elevating member 4. The guide means 3 consist of main guides 3a, connected together at their lower ends by a base 3b and intermediate their opposite ends by a cross-plate 3c, and secondary guides 3d, which are slidable endwise of the main guides 3a. The elevating member 4 slidably engages the secondary guides 3d and is preferably moved endwise thereof by fluid operated means, as later set forth. The opposite outer sides of the main guides 3a are preferably provided with rearwardly extending plates 5 the outer ends of which are suitably pivotally supported on the housing, which encloses the axle for the front wheels 2. As will be observed, this mounting provides for the tilting of the guides 3a and all parts and mechanisms supported on or carried thereby, inwardly and outwardly by a power operated mechanism, indicated as an entirety at 6, connected by a linkage 6a to the cross-plate 3c.

The elevating member 4 consists of spaced supports 4a fixed to and extending inwardly from a pair of plates 7, 7a, which form the rear wall of a frame 8 (see Fig. 3), which forms a part of the carrier 8'. The opposite outer sides of the supports 4a are provided with stud shafts 4b on which rollers 4' are rotatably mounted, the latter having rolling engagement with sides of the secondary guides 3d to facilitate the movement of the elevating member 4 upwardly and downwardly thereon.

Figure 3:
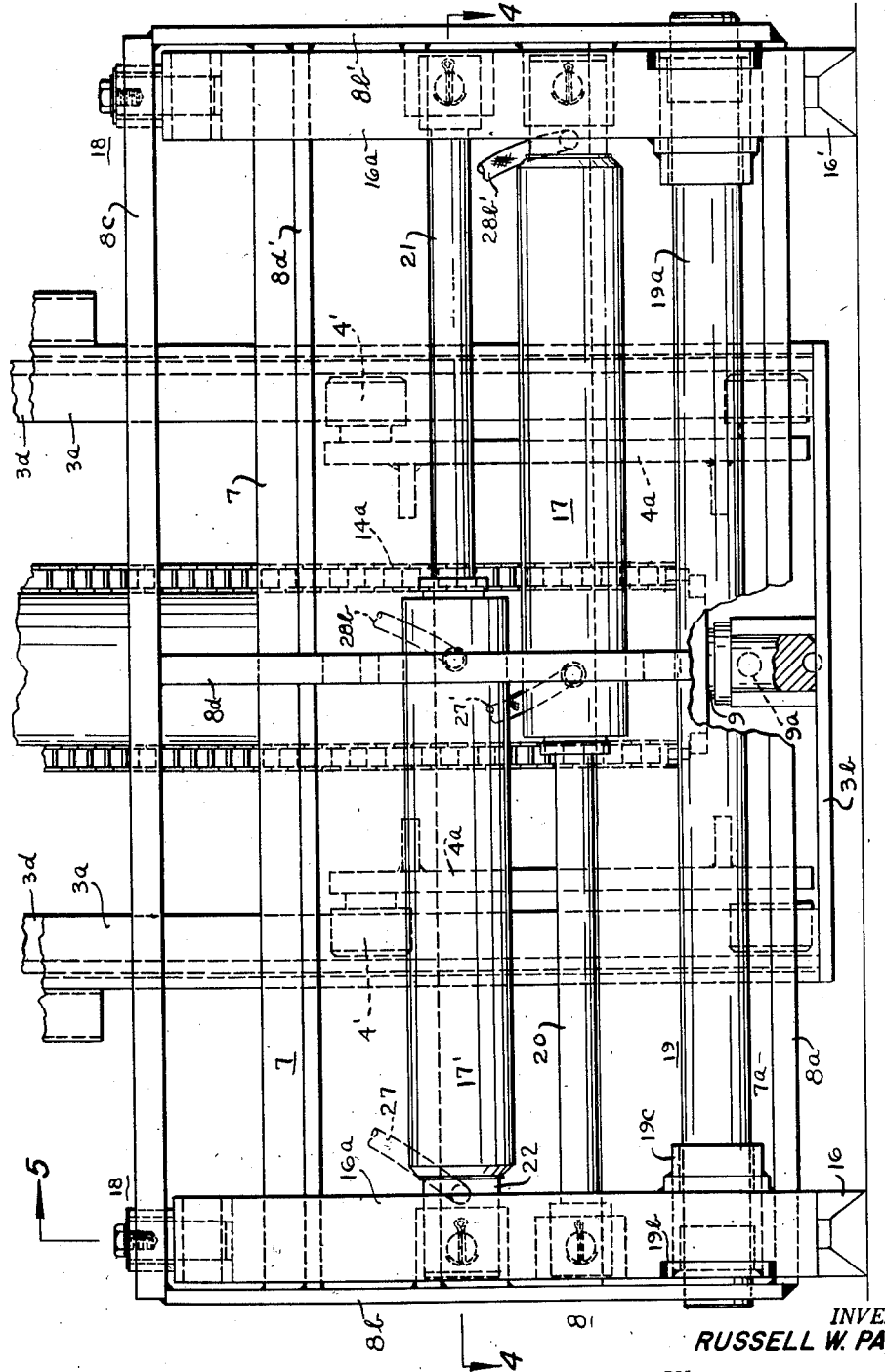
Fig. 3 is an enlarged fragmentary elevational view taken approximately on the line 3—3 of Fig. 1.

The means for raising the elevating member 4, as disclosed herein for exemplification, operates to raise the elevating member 4 and carrier 8' relative to the secondary guides 3d, whereby the carrier is raised to the position shown in dotted lines in Fig. 1; thereafter higher levels for the carrier may be obtained by raising the elevating member 4 and the secondary guides 3d relative to the main guides 3a. The raising means consist of a tubular member 9 mounted at its lower end on the base 3b and extending upwardly therefrom and inner, outer and intermediate cylinders 10, 11, 12, respectively, in concentric relation to the tubular member 9 and each other, as shown in Fig. 4, the inner member 10 extending upwardly beyond the intermediate and outer cylinders. The tubular member 9 is provided at its lower end (*a*) with a fluid connection 9*a*, which is connected with a suitable fluid pressure supply system (not shown) and (*b*) formed with flow ports to supply fluid under pressure to the passage between it and the inner cylinder, the latter being formed with a port to supply pressure to the passage between it and the intermediate cylinder 12. The fluid under pressure is supplied to the tubular member 9 upon operation of a suitable valve (not shown and forming part of the fluid system) which, when operated in one direction by a lever 9′, serves to raise the elevating member 4 to various selected elevated levels; by operating the valve in the opposite direction provides for reverse flow of the fluid, whereby the elevating member 4 may gravitate downwardly. The intermediate cylinder 12 is provided outwardly of the outer cylinder 11 with a collar 13 diametrical sides of which are provided with outwardly extending shafts rotatably supporting reeving devices 14, such as sprockets, on which chains 14*a* are trained. The inner ends of the chains are suitably fixed to anchors 14*b*, preferably provided on the outer cylinder 11 (one being shown in dotted lines in Fig. 1); the outer ends of the chains 14*a* are fixed to brackets 15 mounted on the lower panel 7*a* of the frame 8, as shown in Figs. 3 and 4. Accordingly, when fluid pressure is supplied to the tubular member 9, the intermediate cylinder 12 is initially raised and through the chains 14*a* the carrier 8′ is raised relative to the guides 3*d* to the position shown in dotted lines in Fig. 1; thereafter, if the supply of fluid pressure is continued, the secondary guides 3*d* will be moved upwardly, so that the carrier 8′ will move with the latter and be positioned at a higher level. The raising means above described are similar to the raising means shown and described in Letters Patent No. 2,461,336 to Clarence W. Chanda (to which reference may be made), for which reason these means are not more fully illustrated herein.

The carrier 8′ comprises the frame 8 (already referred to), load engaging and carrying members 16, 16′, each having an upstanding leg 16*a*, mounted on the frame 8 for movement transversely thereof and power means 17, 17′, for moving the members 16, 16′, respectively. The frame 8 consists of a bottom wall 8*a*, side walls 8*b*, 8*b*′, a top wall 8*c* and a rear wall (already referred to). The frame is reinforced by a vertical member 8*d* and horizontal members 8*d*′. 18, 19, indicate upper and lower guide means, respectively, on which the load engaging members 16, 16′, are slidably mounted. The lower guide means 19 consists of guide member 19*a* the opposite ends of which are supported on the frame side walls 8*b*, 8*b*′. The leg 16*a* of each load engaging member 16, 16′, is provided with a rearwardly extending bracket 19*b* (see Fig. 5), the inner end of which is secured (preferably welded) to the adjacent side wall of a sleeve 19*c* surrounding and slidably fitting the guide member 19*a*. The upper guide means 18 consists of a block 18*a* fixed to the upper end of and extending inwardly from each leg 16*a*. The block 18*a* is formed with a vertical opening in which the lower end portion of a stub shaft 18*b* is fixedly mounted. 18*c* indicates a roller provided with a bushing 18′ rotatably mounted on the upper end portion of the shaft 18*b*, the roller having rolling engagement with the rear side of the frame top wall 8*c* as shown in Figs. 1 and 5, during movement of the adjacent load engaging member in either direction. 18*d* indicates an annulus seated on the upper end of the stud shaft 18*b* and secured thereto by a cap screw 18*e* which is threaded in an opening formed in the upper end of the stud shaft 18*b*. The annulus 18*d* lies over the upper ends of the bushing 18′ and roller 18*c* to maintain them in position.

As already set forth, separate fluid operated power means 17, 17′, are provided for moving the load engaging members 16, 16′, transversely of the frame 8 on the guide means 18, 19, each power means consisting of cylinder-piston elements one of which elements is connected to the leg 16*a* of a load engaging member and the other element preferably being connected to and supported on the frame side wall remote from the load engaging member to which the first mentioned element is connected. As the load engaging members are mounted for movement horizontally, the employment of cylinder-piston elements for operating these members provide an economical and simplified form of construction, since both power means may be disposed in parallel horizontal relation and may be connected directly to the frame 8 and one of the load carrying members, and as the cylinder elements, piston elements and piston rods are similar in construction, economy in manufacture, assembly and mounting thereof results. By preference, the respective cylinder-piston elements for moving the load engaging members 16, 16′, are reversely related; that is, the outer end of the cylinder element 17*a* of the power means 17 is supported on the wall 8*b*′ and the reciprocatable piston element 17*a*′ in the cylinder element 17*a* is connected to a piston rod 20, the outer end of which is connected to the leg 16*a* of the load engaging member 16; whereas the outer end of the cylinder element 17*x* of the power means 17′ is supported on the wall 8*b* and the reciprocatable piston 17*x*′ in the cylinder element 17*x* is connected to a rod 21, the outer end of which is connected to the leg 16*a* of the load engaging member 16′.

The outer end of each cylinder 17*a*, 17*x*, is provided with an extension 22, which is formed with an inwardly extending recess 22*a* to provide a seat for a lug 22*b* welded to the inner side of the adjacent frame side wall (side wall 8*b* as shown in Fig. 4). As shown, the side walls of the recess 22*a* and lug 22*b* are formed with alined through openings in which a pin 23 is mounted to pivotally support the adjacent end of the cylinder on the adjacent side wall. The pin 23 is removably held against displacement or removal by suitable cotter pins at opposite sides of the extension 22. The connections between the outer end of each piston rod 20, 21, and the load engaging member operated thereby consist of the following: 24 indicates an annular member fixed to the inner side of the leg 16 for the adjacent load engaging member, the opening in the annular member 24 providing a seat in which the inner end portion of a pin 25 is fixedly mounted. The pin 25 extends through and rotatively fits the walls of an opening 25*a* formed in a connector 26 mounted on the outer end of the adjacent piston rod. The connector 26 is formed with a screw threaded opening 26*a* into which the threaded outer end of the adjacent piston rod is mounted.

The fluid supply and discharge connections for each cylinder element are similarly connected thereto and are shown in Fig. 4 for the cylinder element 17*x*. As shown, one pipe 27 leading from the controlling valve indicated as an entirety at 100 (later referred to) is connected by a suitable fitting 27*a* mounted in an opening 27*b* in communication with a passage 27*c* formed in the outer end wall and extension 22 of the cylinder element. The opposite end of the cylinder element 17*x* is formed with an opening 28 in which a fitting 28*a* is mounted, the latter being connected to a pipe 28*b* leading to the controlling valve 100. Each pipe 27 and 28*b* connected to the opposite ends of the cylinder element 17*x* and the corresponding pipes 27′, 28*b*′, connected to the opposite ends of the cylinder element 17*a* comprise inner and outer sections, the inner section preferably consisting of a metallic pipe and the outer section consisting of a flexible hose, suitably supported in associated relation to the raising means for the elevating member 14 to compensate for movement of the latter and carrier 8′ upwardly and downwardly. In the present form of construction, (*a*) since two cylinder elements 17*a*, 17*x*, are employed, two hose sections for each cylinder element are required, making a total of four flexible sections and (b) two of these flexible sections are mounted on supporting means 29 and the other two flexible sections are mounted on separate supporting means 29'.

By preference the flexible hose sections connected to the opposite ends of the cylinder-element 17x are mounted on the supporting means 29 on the outer side of one of the guides 3a as shown in Figs. 1 and 2, whereas the flexible hose sections connected to the opposite ends of the cylinder element 17a are mounted on the supporting means 29' on the outer side of the other guide 3a. The supporting means 29, 29', are similar in construction, so that one thereof will be referred to, but like parts in the other supporting means will be identified by the same reference characters.

Referring to Figs. 1 and 2, 29a indicates an elongated guide preferably of channel shape in cross section and suitably fixed to and extending longitudinally along the outer side of the adjacent main guide 3a. 29a' indicates a weight slidably fitting the inner walls of the guide 29a and adapted to counter-balance certain movable parts of the mechanism 29. The lower end portion of the weight 29a' is formed with a transverse opening in which the inner end portion of a shaft 29b is mounted; the outer end portion of the shaft supports a pulley 29b' between a pair of plates 29c. 29c' indicates a pulley disposed above and in alinement with the pulley 29b' and rotatable on a shaft 29d suitably supported at its opposite ends on spaced brackets 29d' carried by the adjacent guide 3d. As shown, the pulleys 29b', 29c', are provided with side-by-side peripheral grooves to accommodate the hoses. As shown in Fig. 1, when the elevating member 4 is in its low or normal position, the hose sections extend upwardly around the pulley 29c', then downwardly between guide elements 29x and around pulley 29b' and then upwardly, the outer ends of the hose sections being connected to suitable fittings (not shown), the latter in turn being connected to pipes which lead to and are connected to the valve 100. In operation, when the elevating member 4 is raised relative to the secondary guides 3d to raise the carrier to the position shown in dotted lines in Fig. 1, the hose sections reeve around the pulleys 29b', 29c', and the weight 29a' gravitates downwardly to take up slack in the hose sections; when the guides 3d are moved upwardly to raise the carrier 3' to a higher level, the weight 29a' is moved upwardly and the hose sections reeve around the pulleys 29b', 29c', to pay out the hose sections. In the downward movement of the guides 3d and elevating member 4, the hose sections reeve around the pulleys 29b', 29c', in the opposite direction and the weight moves in the reverse directions. No claim is made herein to the take-up and pay-out mechanism, as I believe such mechanism to be the invention of Charles F. Overbeck, of Lakewood, Ohio, and is shown and described in his co-pending application Ser. No. 256,719, filed November 16, 1951.

Figure 6:
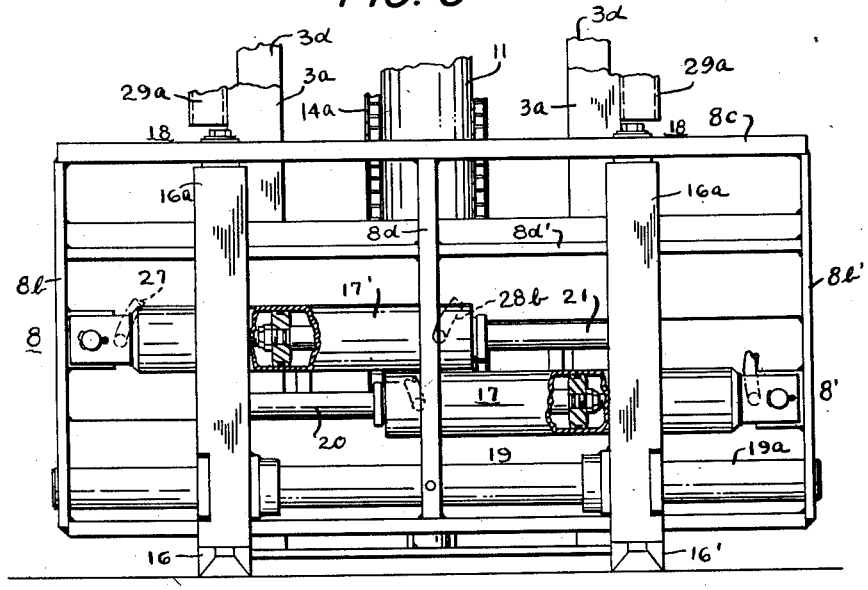
Figure 7:
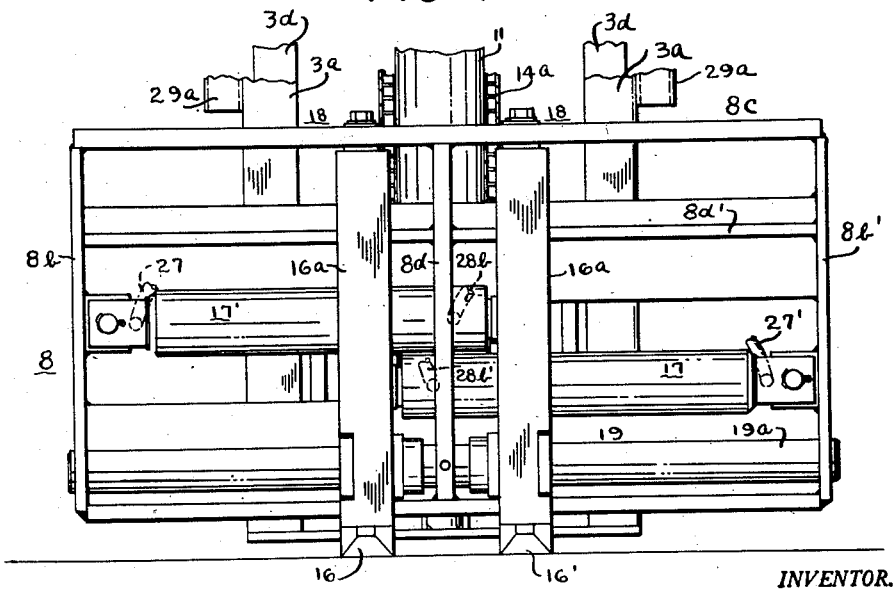

Figs. 6, 7, 8 and 9 show various positions, among others, to which the load engaging members 16, 16', may be moved by selective operation of the levers 103, 103a, dependent on the size of the load and/or its position relative to the load carrier when the load is to be picked up and/or the support or tiered load on which a load is to be discharged. Fig. 3 shows the load engaging members 16, 16', moved to their extreme outer positions adapted to (a) support a large load or (b) receive between them a load, so that upon movement of the members 16, 16', inwardly the load may be clamped between them and raised. Fig. 6 shows both members 16, 16', moved inwardly relatively to the side walls 8b, 8b', and substantially equal distances from the axis of the cylinder 11. Fig. 7 shows the load engaging members 16, 16', moved to their innermost positions. Fig. 8 shows the load engaging member 16' in its innermost position and the load engaging member 16 in its outermost position. Fig. 9 shows the load engaging member 16 in its innermost position and the load engaging member 16' in its outermost position.

The valve mechanism 100 consists of a casing 100a provided with an intermediate wall 100b shaped to provide between the side and end walls of the casing a chamber HP and a separate chamber LP. The lower wall is formed with an inlet 100c connected to a pipe 100c' leading from the outlet of a power driven pump (not shown) forming part of the fluid under pressure supply system, whereby fluid under pressure is supplied to the chamber HP. The upper wall of the casing 100a is formed with an opening 101, in which a nipple 101a is suitably mounted, the outer end of the latter being connected to a pipe 101b leading to the sump or reservoir (not shown), and a second outlet 101x communicating with the chamber LP connected to a pipe 101x' leading to the sump. 102, 102', indicate valve elements (preferably consisting of endwise movable plungers) the operation of which, as later set forth, controls the supply of fluid pressure to the cylinder elements 17a, 17x, respectively, and discharge of fluid therefrom to the sump, by operation of levers 103, 103a, the latter being connected through linkages (not shown) to the inner ends of the valve elements 102, 102', respectively. The wall 100b is formed with through openings 104, 104a, providing guideways for the valve elements 102, 102'. The valve elements 102, 102', are shown in normal position. Each valve element 102, 102', is provided adjacent its outer end with a shoulder to form a seat for an abutment 104' and its outer end supports a second abutment 104a', which is engaged by the inner end of a thimble 104" having a screw threaded adjustable engagement with the walls of an opening 104x formed in the adjacent side wall of the casing 100a, so that by means of a spring 104x' interposed between the abutments, the adjacent valve element, following the operation of the latter in either direction, the linkage connected thereto and the adjacent lever—upon release of the latter—are returned to normal position. One side wall of the casing 100a is formed (a) with fluid flow openings 105, 105a, in communication with annular recesses 105', 105a', respectively, and connected by pipes 27', 28b', to the opposite ends of the cylinder element 17a, respectively, and (b) with fluid flow openings 106, 106a, in communication with annular recesses 106', 106a', respectively, of the valve element 102' and connected by pipes 27, 28b, to the opposite ends of the cylinder element 17x, respectively. The wall 100b is formed with flow passages 107, 108, 109 and 110, whereas the valve elements 102, 102', intermediate their ends are formed with annular relieved sections, as shown at 102a, 102a', respectively, which register with flow passages 108, 109 and 110. When the valve elements are in normal position, fluid supplied to the chamber HP flows through passages 108, 109, 110, to the pipe 101b for discharge to the sump. The valve element 102 is formed adjacent its outer end with a longitudinally extending duct 111 communicating with ports 112, 113, normally disposed at opposite sides of the recess 105' and a second longitudinally extending duct 114 communicating with ports 115, 116, 117, the ports 116, 117, being normally disposed at opposite sides of the recess 105a'. The valve element 102' is provided with similar ducts and ports designated 111', 112', 113', 114', 115', 116', 117', respectively, and accordingly each valve element will operate to control the supply of fluid pressure to either end of the adjacent cylinder and discharge of fluid from its opposite end, so that the following description of the operation of one valve element, namely, valve element 102, will suffice for the other valve element; upon movement of the valve element 102 toward the left, as viewed in Fig. 10, (a) passage 110 is closed, passage 107 through port 115 is connected to duct 114 and port 117 registers with the opening 105a whereby fluid pressure supplied by pipe 100c to chamber HP and flows to one end (outer end) of the adjacent cylinder element (element 17a) and (b) port 113 registers with the opening 105' and port 112 communicates with the chamber LP, whereby discharge of the fluid from the opposite end (inner end) of the cylinder element flows to the chamber LP, and from the latter chamber to and through pipe 101x' to the sump; and upon movement of the valve element 102 from normal position toward the right, as viewed in Fig. 10 (c) passage 110 is closed, port 112 registers with opening 105, port 113 is connected to passage 107, whereby fluid pressure flows to the other end (inner end) of the adjacent cylinder element (element 17a), and (d) port 116 for duct 114 registers with opening 105a and port 117 communicates with chamber LP, whereby fluid flows from the outer end of the adjacent cylinder element (element 17a) to the chamber LP and from the latter chamber to and through the pipe 101x' to the sump. 118 indicates a suitable relief valve.

The outer and inner end portions of each valve element 102, 102', are provided with spring controlled check mechanisms, each indicated as an entirety at 119, adapted to maintain the carrier 8' at a selected position upon operation of the adjacent valve element to neutral position. Each mechanism 119 consists of the following: 119a indicates an inner abutment normally seated on an annular shoulder 119a' outwardly of the port 117 and slidably fitting an enlarged end portion of the duct 114. 120 indicates an outer abutment provided on the adjacent clevis 120a (to which the linkage between the valve element and adjacent operating lever is connected) and extending inwardly therefrom and having screw threaded adjustable engagement with the outer end portion of the duct 114. A spring 121 is interposed between the abutments to maintain pressure on the inner abutment 119a.

Figs. 11 to 15, inclusive, show a modified form of construction wherein the lateral movement of the load engaging members 11x, 11x', are not limited by the width of the transverse frame 30 on which they are slidably supported, but each is movable beyond the adjacent side thereof for increasing the range of operations hereinbefore referred to; on the other hand, as the frame 30 has a width substantially equal to that of the truck, with the load engaging members 11x, 11x', moved inwardly to a position disposed within the sides of the supporting frame 30, the truck may be driven through aisles and other passages in a ready manner. The truck shown is provided with guides 31 for an elevating member slidable vertically thereon and a raising means 32 for the latter. The parts referred to are similar to like parts shown in Figs. 1 to 9 herein.

33 indicates as an entirety a carrier comprising the transverse frame 30 (already referred to) and the load engaging members 11x, 11x', which are slidably supported on the frame. The frame 30 consists of rear and front walls 34, 34a, respectively, spacedly connected together by yokes 35, 35a, 36, 36a, which may be removed, whereby the wall 34a may be disassembled. The rear wall 34 is provided with inwardly extending brackets 37, each supporting upper and lower rollers having rolling engagement with the secondary guides as shown in Fig. 4. Each load engaging member 11x, 11x', is provided with an upstanding leg 38 which is suitably secured (preferably by cap screws) to a plate 38a substantially co-extensive in length to the leg 38. As shown in Figs. 13 and 15 each plate 38a is provided on its inner side and adjacent its opposite ends with upper and lower shoes 39, 39a, welded to the outer end portions of the elongated members 40, 40, and 40a, 40a, respectively. Each member 40, 40, 40a, 40a, preferably consists of a rod having a length substantially equal to the width of the frame 30. 41, 41a, and 42, 42a, indicate upper and lower pairs of tubular members in which the rods 40, 40, 40a, 40a, for the legs 38 are slidably mounted, respectively. The side wall of each tubular member 41, 41a, 42, 42a and front wall 34a are formed with slots 42x, 42x', respectively, to accommodate the shoes for the legs 38. The tubular members of each pair are suitably secured to either wall 34, 34a (by preference the wall 34), one above the other and extend from side-edge to side-edge of the frame 30. In this arrangement of the tubular guide members 41, 41a, and 42, 42a, the entire width of the frame 30 is utilized to provide relatively long supports and guides for the adjacent rods 40, 40a, when the load engaging members 11x, 11x', are moved outwardly. The load engaging members 11x, 11x', are separately operated by fluid pressure supply means 43, 43a, respectively, each of which consist of a cylinder-element 43' preferably secured to the wall 34, and a reciprocatable piston element 43a' within the cylinder element and connected to a piston rod 43x. As shown in Fig. 14, the outer end of the piston rod 43x is pivotally connected to a block 43x', which extends laterally through an elongated slot 34a' formed in the wall 34a and welded to the adjacent plate 38a. It will be observed that (a) the rods 40, 40, are connected at their outer ends to the leg for one of said load engaging members and the rods 40a, 40a, at their opposite outer ends are connected to the leg for the other load engaging member and (b) the cylinder elements are reversely related and disposed between the pairs of guide tubes 41—41a, 42—42a, so that the piston rods 43x are connected to the legs 38 of the load engaging members intermediate the upper and lower connections of the legs to the slidable rods 40—40, 40a—40a, whereby the applied power to the legs outwardly and inwardly is in a direction parallel to the axes of the tubular members 41—41a, 42—42a and the rods 40—40, 40a—40a, are moved axially endwise. The cylinder elements 43', 43' are disposed on parallel axes in overlapping relation to provide long strokes for the piston elements 43a'. Each cylinder element extends from one end of the frame 30 toward its opposite end, the inner end of the cylinder element being spaced from the latter end to accommodate the leg 38 and plate 38a of the adjacent load engaging member and adapted to be engaged by the block 43x' and serve as a stop to limit the inward movement of the load engaging member and plate thereon inwardly of the adjacent end of the frame 30. Each cylinder element 43' is provided at its opposite ends with fluid connections 44, 44a, leading from a valve, as shown in Fig. 10, the latter in turn being connected with a fluid pressure supply and discharge system. The valve, as shown, controls the supply of fluid pressure to either end of each cylinder element and discharge of fluid from its opposite end, whereby either load engaging member 11x, 11x', may be moved in either direction relative to the other load engaging member. Accordingly, the load engaging members 11x, 11x', may be spaced to initially receive between them a load (such as a bale of cotton) and then moved toward each other to clamp the load between them and then raise and transport the load and finally discharge the latter by movement of the members 11x, 11x', outwardly; also the load engaging members 11x, 11x', may be relatively spaced to pick up loads of different sizes and the latter raised, transported and discharged.

From the foregoing description it will be observed that both forms of construction are materially simplified by connecting the cylinder elements and piston elements directly to the frame and respective load engaging members, thereby providing for ready assembly and servicing and a positive control of the movement of the load engaging members in either direction.

To those skilled in the art to which my invention relates, many changes in construction and widely differing embodiments and applications thereof will be apparent without departing from the spirit of the invention. My disclosures and the description herein are purely illustrative and not intended to be in any sense limiting.

What I claim is:

1. A load handling truck comprising a wheeled chassis, a fluid under pressure and discharge system, substantially vertical guide means on said chassis, an elevating member movably mounted on said guide means, a carrier comprising a frame mounted on the elevating member for movement therewith, a pair of load-engaging members each having a support and adapted to be positioned within opposite side edges of said frame, upper and lower pairs of tubular members fixed to said frame, the tubular members of each pair being disposed horizontally and one above the other, upper and lower elongated rods, the upper rod being slidably mounted in one of said upper tubular members and the lower rod being slidably mounted in one of said lower tubular members, connections between the outer ends of said rods and one of said supports, separate upper and lower elongated rods, the last-mentioned upper rod being slidably mounted on the other upper tubular member and said last-mentioned lower rod being slidably mounted on the other lower tubular member, connections between the outer ends of said last-mentioned rods and the other of said supports, and separate fluid pressure operated means for moving said load-engaging members outwardly beyond the opposite ends of said frame and in the reverse direction, said fluid pressure operated means comprising a pair of parallel related cylinder elements fixed to said frame and reciprocable piston elements respectively within said cylinder elements and provided with piston rods, respectively, the outer end of one of said piston rods being connected to the leg of one of said load-engaging members for moving the latter outwardly beyond the adjacent end of said frame and the outer end of the other piston rod being connected to the leg on the other load-engaging member for moving the latter outwardly beyond the other end of said frame, separate and independent valves for each of said cylinder elements for selectively controlling pressure supply and exhaust connections to the opposite ends of the respective cylinder elements and each operable to selectively block the connections to the respective cylinder element and to selectively cause relative movement of the respective cylinder element and its cooperating piston element in either direction, and conduits connecting each of said valves with the pressure fluid supply and discharge system independently of the other valve whereby said valves may be operated independently of and simultaneously with each other and said supports may be moved in either direction along said tubular members independently of and simultaneously with each other.

2. A load-handling truck comprising a wheel-supporting framework, a fluid under pressure supply and discharge system, substantially vertical guide means on said supporting framework, an elevating member movably mounted on said guide means, a load carrier mounted on said elevating member for movement therewith and comprising a frame having a pair of load-engaging members, each of said load-engaging members extending outwardly therefrom and each having a support at its inner end to be positionable within the opposite side edges of said frame, upper and lower guide devices fixed to said frame and extending horizontally and substantially from side edge to side edge thereof, elongated members movably mounted on said guide devices respectively, the opposite outer ends of said elongated members being connected to said supports respectively, and first and second separate fluid pressure operated means for moving said load engaging member in directions to move the members outwardly beyond the opposite side edges of said frame and in the reverse direction, said fluid pressure operating means comprising parallel and reversibly related cylinder elements fixed to said frame and respective reciprocable piston elements in said cylinder elements operatively connected to said supports respectively for moving the latter on said guide devices, separate and independent valves for each of said cylinder elements for selectively controlling pressure supply and exhaust connections to the opposite ends of the respective cylinder elements and each operable to selectively block the connections to the respective cylinder element and to selectively cause relative movement of the respective cylinder element and its cooperating piston element in either direction, and conduits connecting each of said valves with said pressure fluid supply and discharge system independently of the other valve whereby said valves may be operated independently of and simultaneously with each other and said supports may be moved in either direction along said horizontally disposed guide means independently of and simultaneously with each other.

References Cited in the file of this patent

UNITED STATES PATENTS

| | | |
|---|---|---|
| 1,743,005 | Resler | Jan. 7, 1930 |
| 2,571,550 | Ehmann | Oct. 16, 1951 |
| 2,574,045 | Lapham | Nov. 6, 1951 |
| 2,611,498 | Broersma | Sept. 23, 1952 |
| 2,613,830 | Ponnequin | Oct. 14, 1952 |
| 2,663,443 | Schenkelberger | Dec. 22, 1953 |
| 2,665,022 | Dunham | Jan. 5, 1954 |